US011829793B2

(12) United States Patent
Voltz

(10) Patent No.: US 11,829,793 B2
(45) Date of Patent: Nov. 28, 2023

(54) UNIFIED MANAGEMENT OF VIRTUAL MACHINES AND BARE METAL COMPUTERS

(71) Applicant: VMware, Inc., Palo Alto, CA (US)

(72) Inventor: Renaud B. Voltz, Los Altos Hills, CA (US)

(73) Assignee: VMWARE, INC., Palo Alto, CA (US)

( * ) Notice: Subject to any disclaimer, the term of this patent is extended or adjusted under 35 U.S.C. 154(b) by 349 days.

(21) Appl. No.: 17/107,561

(22) Filed: Nov. 30, 2020

(65) Prior Publication Data

US 2022/0100544 A1 Mar. 31, 2022

Related U.S. Application Data

(60) Provisional application No. 63/084,534, filed on Sep. 28, 2020, provisional application No. 63/084,536, filed on Sep. 28, 2020.

(51) Int. Cl.
*G06F 9/455* (2018.01)
*G06F 9/54* (2006.01)
(Continued)

(52) U.S. Cl.
CPC ........ *G06F 9/45558* (2013.01); *G06F 9/4406* (2013.01); *G06F 9/45541* (2013.01);
(Continued)

(58) Field of Classification Search
None
See application file for complete search history.

(56) References Cited

U.S. PATENT DOCUMENTS 5,884,313 A 3/1999 Talluri et al.
5,887,134 A 3/1999 Ebrahim
(Continued)

FOREIGN PATENT DOCUMENTS

CA 2672100 A1 6/2008
CA 2918551 A1 7/2010
(Continued)

OTHER PUBLICATIONS

Author Unknown, "An Introduction to SmartNICs" The Next Platform, Mar. 4, 2019, 4 pages, retrieved from https://www.nextplatform.com/2019/03/04/an-introduction-to-smartnics/.
(Continued)

*Primary Examiner* — Syed A Roni
(74) *Attorney, Agent, or Firm* — ADELI LLP

(57) ABSTRACT

Some embodiments provide a method for a compute manager that manages (i) virtual machines executing on host computers and (ii) physical computers. The method uses a first set of application programming interfaces (APIs) to communicate with a virtual machine (VM) executing on a host first computer via a hypervisor executing on the host first computer. The method uses the first set of APIs to communicate with a second computer via a smart network interface controller (NIC) of the second computer, wherein the smart NIC translates the first set of APIs into a different, second set of APIs for the second computer so that the compute manager manages the VM and the second computer with the same first set of APIs.

21 Claims, 12 Drawing Sheets

(51) Int. Cl.
*G06F 13/42* (2006.01)
*G06F 9/4401* (2018.01)

(52) U.S. Cl.
CPC .......... *G06F 9/547* (2013.01); *G06F 13/4221* (2013.01); *G06F 2009/4557* (2013.01); *G06F 2009/45591* (2013.01); *G06F 2009/45595* (2013.01); *G06F 2213/0026* (2013.01)

(56) References Cited

U.S. PATENT DOCUMENTS

| | | |
|---|---|---|
| 5,974,547 A | 10/1999 | Klimenko |
| 6,141,749 A | 10/2000 | Coss et al. |
| 6,219,699 B1 | 4/2001 | McCloghrie et al. |
| 6,393,483 B1 | 5/2002 | Latif et al. |
| 6,496,935 B1 | 12/2002 | Fink et al. |
| 6,594,704 B1 | 7/2003 | Birenback et al. |
| 6,738,821 B1 | 5/2004 | Wilson et al. |
| 6,856,995 B1 | 2/2005 | Ibitayo et al. |
| 6,880,089 B1 | 4/2005 | Bommareddy et al. |
| 6,963,921 B1 | 11/2005 | Yang et al. |
| 7,055,173 B1 | 5/2006 | Chaganty et al. |
| 7,079,544 B2 | 7/2006 | Wakayama et al. |
| 7,136,926 B1 | 11/2006 | Iyer et al. |
| 7,349,382 B2 | 3/2008 | Marimuthu et al. |
| 7,424,710 B1 | 9/2008 | Nelson et al. |
| 7,512,071 B2 | 3/2009 | Goldschmidt et al. |
| 7,606,260 B2 | 10/2009 | Oguchi et al. |
| 7,760,733 B1 | 7/2010 | Eiriksson et al. |
| 7,774,502 B2 | 8/2010 | Murthy et al. |
| 7,818,452 B2 | 10/2010 | Matthews et al. |
| 7,849,168 B2 | 12/2010 | Utsunomiya et al. |
| 7,853,998 B2 | 12/2010 | Blaisdell et al. |
| 7,913,294 B1 | 3/2011 | Maufer et al. |
| 7,948,986 B1 | 5/2011 | Ghosh et al. |
| 8,032,933 B2 | 10/2011 | Turley et al. |
| 8,108,550 B2 | 1/2012 | Lahoti et al. |
| 8,145,768 B1 | 3/2012 | Hawthorne |
| 8,190,767 B1 | 5/2012 | Maufer et al. |
| 8,194,674 B1 | 6/2012 | Pagel et al. |
| 8,365,294 B2 | 1/2013 | Ross |
| 8,442,059 B1 | 5/2013 | Iglesia et al. |
| 8,615,009 B1 | 12/2013 | Ramamoorthi et al. |
| 8,660,129 B1 | 2/2014 | Brendel et al. |
| 8,825,900 B1 | 9/2014 | Gross et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,082 B2 | 4/2015 | Dyke |
| 9,008,085 B2 | 4/2015 | Kamble et al. |
| 9,015,823 B2 | 4/2015 | Koponen et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,697,019 B1 | 7/2017 | Fitzgerald et al. |
| 9,729,512 B2 | 8/2017 | Jain et al. |
| 9,755,903 B2 | 9/2017 | Masurekar et al. |
| 9,806,948 B2 | 10/2017 | Masurekar et al. |
| 9,825,913 B2 | 11/2017 | Jain et al. |
| 9,952,782 B2 | 4/2018 | Chandrasekaran et al. |
| 10,050,884 B1 | 8/2018 | Dhanabalan et al. |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | Pierre et al. |
| 10,567,308 B1 | 2/2020 | Subbiah et al. |
| 10,873,566 B2 | 12/2020 | Han |
| 10,997,106 B1 | 5/2021 | Bandaru et al. |
| 11,005,755 B2 | 5/2021 | Yu et al. |
| 11,019,030 B2 | 5/2021 | Jain et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 2002/0069245 A1 | 6/2002 | Kim |
| 2003/0005144 A1 | 1/2003 | Engel et al. |
| 2003/0093481 A1 | 5/2003 | Mitchell et al. |
| 2003/0097589 A1 | 5/2003 | Syvanne |
| 2003/0123452 A1 | 7/2003 | Cox et al. |
| 2003/0130833 A1 | 7/2003 | Brownell et al. |
| 2003/0140124 A1 | 7/2003 | Burns |
| 2003/0145114 A1 | 7/2003 | Gertner |
| 2003/0161272 A1 | 8/2003 | Teplitsky |
| 2003/0200290 A1 | 10/2003 | Zimmerman et al. |
| 2003/0212900 A1 | 11/2003 | Liu et al. |
| 2003/0217119 A1 | 11/2003 | Raman et al. |
| 2004/0022259 A1 | 2/2004 | Tuchow |
| 2004/0049701 A1 | 3/2004 | Pennec et al. |
| 2005/0053079 A1 | 3/2005 | Havala |
| 2005/0114337 A1 | 5/2005 | Lunteren |
| 2005/0198125 A1 | 9/2005 | Beck et al. |
| 2005/0229246 A1 | 10/2005 | Rajagopal et al. |
| 2005/0238022 A1 | 10/2005 | Panigrahy |
| 2006/0002386 A1 | 1/2006 | Yik et al. |
| 2006/0029056 A1 | 2/2006 | Perera et al. |
| 2006/0041894 A1 | 2/2006 | Cheng et al. |
| 2006/0191003 A1 | 8/2006 | Bahk et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0011734 A1 | 1/2007 | Balakrishnan et al. |
| 2007/0056038 A1 | 3/2007 | Lok |
| 2007/0061492 A1 | 3/2007 | Riel |
| 2007/0174850 A1 | 7/2007 | Zur |
| 2008/0008202 A1 | 1/2008 | Terrell et al. |
| 2008/0028097 A1 | 1/2008 | Makela |
| 2008/0072305 A1 | 3/2008 | Casado et al. |
| 2008/0163207 A1 | 7/2008 | Reumann et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007251 A1 | 1/2009 | Abzarian et al. |
| 2009/0089537 A1 | 4/2009 | Vick et al. |
| 2009/0119087 A1 | 5/2009 | Ang et al. |
| 2009/0129271 A1 | 5/2009 | Ramankutty et al. |
| 2009/0129394 A1 | 5/2009 | Bar-Kovetz et al. |
| 2009/0150521 A1 | 6/2009 | Tripathi |
| 2009/0161547 A1 | 6/2009 | Riddle et al. |
| 2009/0161673 A1 | 6/2009 | Breslau et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0327781 A1 | 12/2009 | Tripathi |
| 2010/0014526 A1 | 1/2010 | Chavan et al. |
| 2010/0037311 A1 | 2/2010 | He et al. |
| 2010/0070677 A1 | 3/2010 | Thakkar |
| 2010/0100616 A1 | 4/2010 | Bryson et al. |
| 2010/0115174 A1 | 5/2010 | Akyol et al. |
| 2010/0115208 A1 | 5/2010 | Logan |
| 2010/0125667 A1 | 5/2010 | Soundararajan |
| 2010/0165874 A1 | 7/2010 | Brown et al. |
| 2010/0257580 A1 | 10/2010 | Zhao |
| 2010/0275199 A1 | 10/2010 | Smith et al. |
| 2010/0287306 A1 | 11/2010 | Matsuda |

(56) References Cited

U.S. PATENT DOCUMENTS

| | | |
|---|---|---|
| 2011/0016467 A1 | 1/2011 | Kane |
| 2011/0022695 A1 | 1/2011 | Dalal et al. |
| 2011/0060859 A1 | 3/2011 | Shukla et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0134920 A1 | 6/2011 | Dyke |
| 2011/0219170 A1 | 9/2011 | Frost et al. |
| 2011/0225647 A1 | 9/2011 | Dilley et al. |
| 2011/0246637 A1 | 10/2011 | Murakami |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207039 A1 | 8/2012 | Srinivasan et al. |
| 2012/0207174 A1 | 8/2012 | Shieh |
| 2012/0240182 A1 | 9/2012 | Narayanaswamy et al. |
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0007740 A1 | 1/2013 | Kikuchi et al. |
| 2013/0033993 A1 | 2/2013 | Cardona et al. |
| 2013/0044631 A1 | 2/2013 | Biswas et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0073743 A1 | 3/2013 | Ramasamy et al. |
| 2013/0125122 A1 | 5/2013 | Hansen |
| 2013/0125230 A1 | 5/2013 | Koponen et al. |
| 2013/0145106 A1 | 6/2013 | Kan |
| 2013/0163594 A1 | 6/2013 | Sharma et al. |
| 2013/0227097 A1 | 8/2013 | Yasuda et al. |
| 2013/0227550 A1 | 8/2013 | Weinstein et al. |
| 2013/0265883 A1 | 10/2013 | Henry et al. |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0332983 A1 | 12/2013 | Koorevaar et al. |
| 2013/0346583 A1 | 12/2013 | Low et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0068602 A1 | 3/2014 | Gember et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumitriu et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1* | 8/2014 | Sethuramalingam ......... G06F 9/45533 718/1 |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0281030 A1 | 9/2014 | Cui et al. |
| 2014/0282855 A1 | 9/2014 | Clark et al. |
| 2014/0330977 A1 | 11/2014 | Bemmel |
| 2014/0373148 A1 | 12/2014 | Nelms et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0082417 A1 | 3/2015 | Bhagwat et al. |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0142320 A1 | 5/2016 | Gyllenhammer et al. |
| 2016/0156591 A1 | 6/2016 | Zhou et al. |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | Deguillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0180273 A1 | 6/2017 | Daly et al. |
| 2017/0180414 A1 | 6/2017 | Andrews et al. |
| 2017/0180477 A1 | 6/2017 | Hashimoto |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0214549 A1 | 7/2017 | Yoshino et al. |
| 2017/0244671 A1 | 8/2017 | Kamalakantha et al. |
| 2017/0244673 A1 | 8/2017 | Han |
| 2017/0244674 A1 | 8/2017 | Han |
| 2017/0264622 A1 | 9/2017 | Cooper et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0097778 A1 | 4/2018 | Jain et al. |
| 2018/0109471 A1 | 4/2018 | Chang et al. |
| 2018/0152540 A1 | 5/2018 | Niell et al. |
| 2018/0203719 A1 | 7/2018 | Zhang et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0026146 A1 | 1/2019 | Peffers et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |

(56) References Cited

U.S. PATENT DOCUMENTS

| | | |
|---|---|---|
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1* | 7/2020 | Pianigiani ............... H04L 45/74 |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0176212 A1 | 6/2021 | Han |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0273911 A1 | 9/2021 | Jain et al. |
| 2021/0314232 A1 | 10/2021 | Nainar et al. |
| 2021/0357242 A1 | 11/2021 | Ballard et al. |
| 2021/0359955 A1 | 11/2021 | Musleh et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |
| 2023/0195488 A1 | 6/2023 | Ang et al. |
| 2023/0195675 A1 | 6/2023 | Ang et al. |
| 2023/0198833 A1 | 6/2023 | Ang et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2748750 A1 | 7/2014 |
| EP | 3598291 A1 | 1/2020 |
| EP | 4127923 A1 | 2/2023 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2008095010 A1 | 8/2008 |
| WO | 2010008984 A2 | 1/2010 |
| WO | 2013074828 A1 | 5/2013 |
| WO | 2015187201 A1 | 12/2015 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.

Author Unknown, "Package Manager," Wikipedia, Sep. 8, 2020, 10 pages.

Author Unknown, "VMDK", Wikipedia, May 17, 2020, 3 pages, retrieved from https://en.wikipedia.org/w/index.php?title=VMDK&oldid=957225521.

Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.

Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.

Liu, Ming, et al., "Offloading Distributed Applications onto SmartNICs using iPipe," SIGCOMM '19, Aug. 19-23, 2019, 16 pages, ACM, Beijing, China.

PCT International Search Report and Written Opinion of Commonly Owned International Patent Application PCT/US2021/042121, dated Oct. 27, 2021, 13 pages, International Searching Authority (EPO).

Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.

Author Unknown, "vSAN Planning and Deployment" Update 3, Aug. 20, 2019, 85 pages, VMware, Inc., Palo Alto, CA, USA.

Author Unknown, "What is End-to-End Encryption and How does it Work?," Mar. 7, 2018, 4 pages, Proton Technologies AG, Geneva, Switzerland.

Harris, Jim, "Accelerating NVME-oF* for VMs with the Storage Performance Development Kit," Flash Memory Summit, Aug. 2017, 18 pages, Intel Corporation, Santa Clara, CA.

Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.

Anwer, Muhammad Bilal, et al., "Building a Fast, Virtualized Data Plane with Programmable Hardware," Aug. 17, 2009, 8 pages, VISA'09, ACM, Barcelona, Spain.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

Non-Published Commonly Owned U.S. Appl. No. 17/091,663, filed Nov. 6, 2020, 29 pages, VMware, Inc.

(56) References Cited

OTHER PUBLICATIONS

Non-Published Commonly Owned Related U.S. Appl. No. 17/107,568 with similar specification, filed Nov. 30, 2020, 39 pages, VMware, Inc.
Non-Published Commonly Owned U.S. Appl. No. 17/114,975, filed Dec. 8, 2020, 52 pages, VMware, Inc.
Non-Published Commonly Owned U.S. Appl. No. 17/114,994, filed Dec. 8, 2020, 51 pages, VMware, Inc.
Non-Published Commonly Owned U.S. Appl. No. 17/145,318, filed Jan. 9, 2021, 70 pages, VMware, Inc.
Non-Published Commonly Owned U.S. Appl. No. 17/145,319, filed Jan. 9, 2021, 70 pages, VMware, Inc.
Non-Published Commonly Owned U.S. Appl. No. 17/145,320, filed Jan. 9, 2021, 70 pages, VMware, Inc.
Non-Published Commonly Owned U.S. Appl. No. 17/145,321, filed Jan. 9, 2021, 49 pages, VMware, Inc.
Non-Published Commonly Owned U.S. Appl. No. 17/145,322, filed Jan. 9, 2021, 49 pages, VMware, Inc.
Non-Published Commonly Owned U.S. Appl. No. 17/145,329, filed Jan. 9, 2021, 50 pages, VMware, Inc.
Non-Published Commonly Owned U.S. Appl. No. 17/145,334, filed Jan. 9, 2021, 49 pages, VMware, Inc.
Peterson, Larry L., et al., "OS Support for General-Purpose Routers," Month Unknown 1999, 6 pages, Department of Computer Science, Princeton University.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Spalink, Tammo, et al., "Building a Robust Software-Based Router Using Network Processors," Month Unknown 2001, 14 pages, ACM, Banff, Canada.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Angeles, Sara, "Cloud vs. Data Center: What's the difference?" Nov. 23, 2018, 1 page, retrieved from https://www.businessnewsdaily.com/4982-cloud-vs-data-center.html.
Author Unknown, "Middlebox," Wikipedia, Nov. 19, 2019, 1 page, Wikipedia.com.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.
Author Unknown, "8.6 Receive-Side Scaling (RSS)," Month Unknown 2020, 2 pages, Red Hat, Inc.
Herbert, Tom, et al., "Scaling in the Linux Networking Stack," Jun. 2, 2020, retrieved from https://01.org/linuxgraphics/gfx-docs/drm/networking/scaling.html.
Non-Published Commonly Owned U.S. Appl. No. 16/890,890, filed Jun. 2, 2020, 39 pages, VMware, Inc.
Stringer, Joe, et al., "OVS Hardware Offloads Discussion Panel," Nov. 7, 2016, 37 pages, retrieved from http://openvswitch.org/support/ovscon2016/7/1450-stringer.pdf.
Non-Published Commonly Owned Related International Patent Application PCT/US2021/042121 with similar specification, filed Jul. 17, 2021, 39 pages, VMware, Inc.
Non-Published Commonly Owned U.S. Appl. No. 17/461,908, filed Aug. 30, 2021, 60 pages, Nicira, Inc.
Author Unknown, "CISCO Identity-Based Firewall Security," Month Unknown 2011, 2 pages, CISCO Systems, Inc.
Author Unknown, "Hypervisor," Aug. 13, 2020, 1 page, VMware.com.
Author Unknown, "Transparent," Free On-Line Dictionary of Computing (FOLDOC), Jun. 6, 1996, 1 page, retrieved from http://foldoc.org/transparent.
Author Unknown, "AppLogic Features," Jul. 2007, 2 pages, 3TERA, Inc.
Author Unknown, "Enabling Service Chaining on Cisco Nexus 1000V Series," Month Unknown, 2012, 25 pages, CISCO.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Casado, Martin, et al., "Sane: A Protection Architecture for Enterprise Networks," Proceedings of the 15th USENIX Security Symposium, Jul. 31-Aug. 4, 2006, 15 pages, USENIX, Vancouver, Canada.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Guichard, J., et al., "Network Service Chaining Problem Statement," Network Working Group, Jun. 13, 2013, 14 pages, Cisco Systems, Inc.
Ioannidis, Sotiris, et al., "Implementing a Distributed Firewall," CCS '00, Month Unknown 2000, 10 pages, ACM, Athens, Greece.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Li, Junnan, et al., "DrawerPipe: A Reconfigurable Pipeline for Network Processing on FGPA-Based SmartNIC," Electronics 2020, Dec. 10, 2019, 24 pages, retrieved from https://www.mdpi.com/2079-9292/9/1/59.
Litvak, Michail, "Linux—IP-RULE(8): Routing Policy Database Management," Apr. 10, 2014, 5 pages, retrieved from https://man7.org/linux/man-pages/man8/ip-rule.8.html.
Mohammadkhan, Ali, et al., "PANFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.
Non-Published Commonly Owned U.S. Appl. No. 18/196,844, filed May 12, 2023, 41 pages, Nicira, Inc.
Olds, Dan, "OS Virtualization vs. Hypervisor: Why You Should Offer Both," Oct. 19, 2008, 3 pages, techtarget.com.
Pagiamtzis, Kostas, et al.,"Content-Addressable Memory (CAM) Circuits and Architectures: A Tutorial and Survey," IEEE Journal of Solid-State Circuits, Mar. 2006, 16 pages, vol. 41, No. 3.
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture of a Identity Based Firewall System," Jul. 2011, 9 pages.

* cited by examiner

UNIFIED MANAGEMENT OF VIRTUAL MACHINES AND BARE METAL COMPUTERS

BACKGROUND

A datacenter or set of datacenters may include both host computers that host virtual machines (VMs) as well as physical "bare metal" servers. The bare metal servers are provisioned using different files (e.g., an optical disc (ISO) image, a dd image, or a similar format) than the VMs, which use VM-specific format (e.g., virtual machine disk image (VMDK)). As such, two separate disk image files in two different formats are required to deploy the same image on two different computers. Similarly, the interface (e.g., the APIs) used by a compute manager (e.g., VMware's vCenter) to communicate with VMs are not applicable to bare metal computers. As such, techniques that unify the management of the devices within a datacenter or set of datacenters would be useful.

BRIEF SUMMARY

Some embodiments provide methods for using a smart network interface controller (NIC) to manage a bare metal computer in a physical network (e.g., a datacenter or set of datacenters) in a manner similar to the management of virtual machines (VMs) in the same network. Specifically, some embodiments use the smart NIC (i) to enable the bare metal computer to access a VM image and execute the operating system and applications defined by the VM image and/or (ii) to enable a compute manager for the network to communicate with the bare metal computer using the same application programming interfaces (APIs) as for communication with VMs on host computers in the network.

The smart NIC, in some embodiments, is a NIC that includes (i) an application specific integrated circuit (ASIC), (ii) a general-purpose central processing unit (CPU), and (iii) memory. The ASIC, in some embodiments, is an I/O ASIC that handles the processing of packets forwarded to and from the computer, and is at least partly controlled by the CPU. The CPU executes a NIC operating system in some embodiments that controls the ASIC and can run other programs, such as API translation logic to enable the compute manager to communicate with the bare metal computer and to enable the bare metal computer to access the VM image. The smart NIC also includes a configurable peripheral control interface express (PCIe) interface in order to connect to the other physical components of the bare metal computer system (e.g., the x86 CPU, memory, etc.). Via this configurable PCIe interface, the smart NIC can present itself to the bare metal computer system as a multitude of devices, including a packet processing NIC, a hard disk (using non-volatile memory express (NVMe) over PCIe), or other devices.

Although not necessary for managing a bare metal computer, the NIC operating system of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

The smart NIC of some embodiments, as mentioned, enables the bare metal computer system to use a virtual machine image rather than an internal hard disk (or similar local non-volatile memory). The smart NIC connects (via the PCIe bus) to the other components of the bare metal computer system (e.g., the x86 processor(s), the memory) and appears to these components as a local NVMe disk. As such, the bare metal computer sends read/write instructions to the smart NIC (to boot the system, run applications, read and write files, etc.), and the smart NIC streams the required data to and from the VM image at the external storage using NVMe over Fabric (NVMeOF) or a remote distributed storage area network (DSAN) cluster protocol. So long as the external storage is NVMeOF-capable, this external storage may be any type of network-accessible storage (e.g., a distributed storage such as virtual storage area network (VSAN), a storage array, a storage associated with a compute manager, etc.). The read/write commands, in some embodiments, are disk read/write instructions from the CPU, which the smart NIC translates into file read/write commands and sends over NVMeOF.

The VM disk image, in some embodiments, is stored in a proprietary VM-specific format, such as VM disk image (VMDK). The use of such a VM image enables a network administrator to save an image of a configured VM and then use that image to instantiate numerous VMs and/or physical servers. That is, the same VM image that is used to instantiate VMs in the network may also be used for the configuration (e.g., operating system, applications, etc.) of a bare metal physical computer. Thus, the same configuration can be applied by a user of the network to both types of machines (virtual and physical machines).

The smart NIC also enables unified management of the VMs and bare metal computers in the network by enabling a compute manager that manages the machines in the network to use a same set of APIs for configuration and control of the VMs and bare metal computers. Typically, different APIs are used to communicate with VMs than are used to communicate with the bare metal hardware for operations such as powering on/off and configuring the machines and for providing remote console input (e.g., keyboard/mouse/touch input).

The use of a smart NIC, at least at the bare metal computers, allows for the compute manager to use a uniform set of APIs, with the smart NIC translating API requests in a first format from the compute manager into API requests in a second format native to the bare metal computer. For instance, physical computers typically use intelligent platform management interface (IPMI) or Redfish for remote configuration, retrieval of physical resource statistics, etc., whereas for VMs other protocols are used (e.g., platform-specific protocols). The smart NIC operating system of some embodiments includes translation logic that translates the API calls and responses between a unified format used by the compute manager and the native format of the bare metal computer system. In some embodiments, either a hypervisor executing on a host computer or a smart NIC of the host computer also translates API calls and responses between the unified format used by the compute manager and the format used by the VMs.

Through these techniques enabled by the smart NIC of some embodiments, the compute manager of some embodiments (e.g., VMware's vCenter) can manage a network with both hosted VMs and bare metal physical computers while treating each of these types of machines in the same manner. That is, the UI tools, management stacks, etc. for managing VMs can be applied equally to both VMs and bare metal physical computers. These tools include tools for managing and deploying VM images that can now be applied to deploying these images on bare metal physical computers, as well as tools for configuring, viewing, and accessing machines in the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods for using a smart network interface controller (NIC) to manage a bare metal computer in a physical network (e.g., a datacenter or set of datacenters) in a manner similar to the management of virtual machines (VMs) in the same network. Specifically, some embodiments use the smart NIC (i) to enable the bare metal computer to access a VM image and execute the operating system and applications defined by the VM image and/or (ii) to enable a compute manager for the network to communicate with the bare metal computer using the same application programming interfaces (APIs) as for communication with VMs on host computers in the network.

Figure 1:
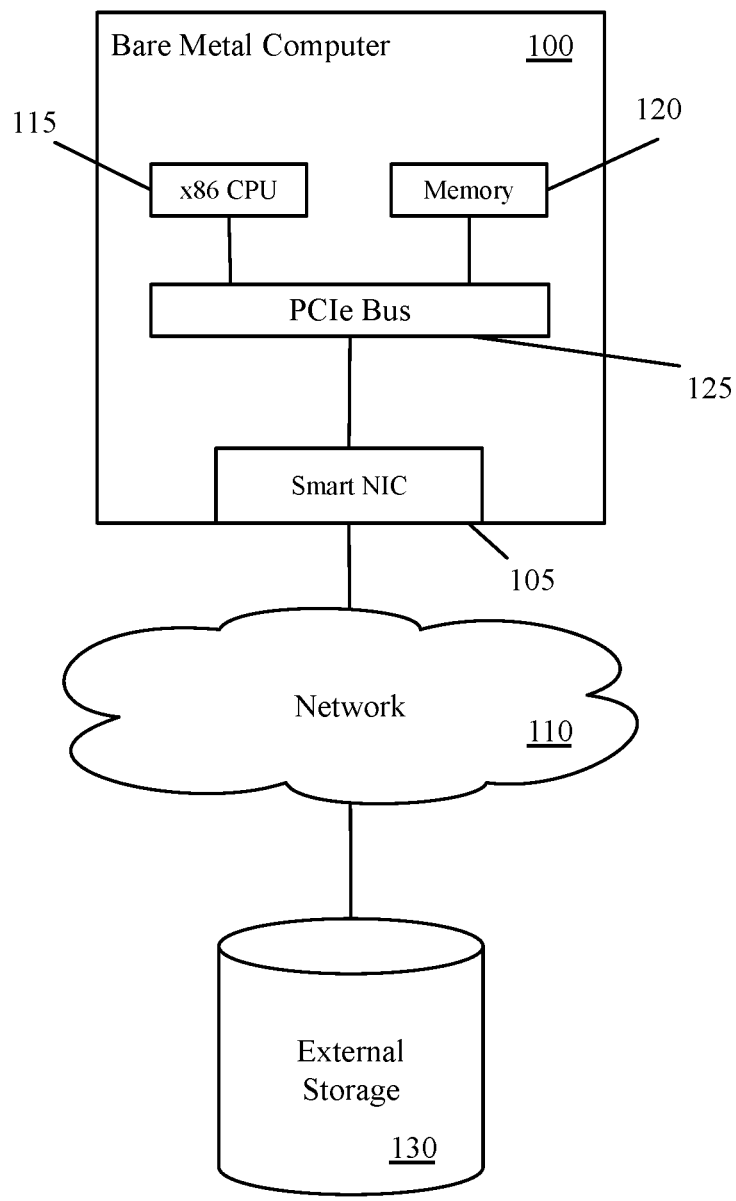
FIG. 1 conceptually illustrates a bare metal computer with a smart NIC according to some embodiments.

FIG. 1 conceptually illustrates a bare metal computer 100 with a smart NIC 105 according to some embodiments. The bare metal computer 100 is a physical server in a network 110. This network 110 may be a datacenter network or represent a network implemented across a set of datacenters in different embodiments. As shown, the bare metal computer 100 includes an x86 general-purpose central processing unit (CPU) 115, a memory 120, and a peripheral control interface express (PCIe) bus 125, in addition to the smart NIC 105. The x86 CPU 115 represents one or more physical CPU cores; many physical devices have multiple cores. Similarly, the memory 120 represents the collective volatile memory of the bare metal computer 100.

In addition, while both the CPU 115 and the memory 120 are shown as directly connected to the PCIe bus 125, it should be understood that many different physical configurations are possible for this hardware, and not all (or necessarily any) of the CPU cores and/or memory will necessarily be directly connected to the PCIe bus 125. Rather, the smart NIC 105 connects to the PCIe bus 125 through a physical PCIe interface and can communicate with the CPU 115 via the PCIe bus 125, even if this communication uses other buses. Similarly, the memory 120 could be connected directly to the CPU cores in some embodiments. It should also be noted that the bare metal computer system 100 will typically include many other hardware elements not shown in this figure, such as one or more GPUs, non-volatile storage (which might not be used to store the operating system and application software, in some embodiments).

The smart NIC 105 connects the bare metal computer 100 to the physical network 110. Though not shown, many other bare metal computers and/or host computers (on which data compute nodes (DCNs), such as VMs, containers, etc. are hosted) may also be connected to the network. In addition, an external storage 130 is accessible to the smart NIC 105 (and thus the bare metal computer 100) via the network 110. This external storage 130 represents any of a number of different types of storages, such as a hyperconverged infrastructure storage (e.g., a virtual storage area network (VSAN)), a logical storage volume (e.g., a virtualized storage area network or network attached storage array), a storage associated with a compute manager, or any other network-accessible storage.

Distributed storage (e.g., VSAN) is a storage virtualization software that uses a software-defined approach to create shared storage for VMs or, using smart NICs, bare metal computers. This distributed storage technology of some embodiments virtualizes physical storage resources (e.g., of host computers) and turns these storage resources into pools (clusters) of storage that can be divided and assigned to VMs, bare metal computing devices, and applications according to their respective requirements. In some embodiments, the distributed storage manages data in the form of flexible data containers (objects), which are logical volumes that have data and metadata distributed across a cluster. Thus, a virtual machine disk image file would be an object in such a storage architecture. The features of such a distributed storage service in some embodiments include (1) data efficiency processes, such as deduplication operations, compression operations, and thin provisioning, (2) security processes, such as end-to-end encryption, and access control operations, (3) data and life cycle management, such as storage vMotion, snapshot operations, snapshot schedules, cloning, disaster recovery, backup, long term storage, (4) performance optimizing operations, such as QoS policies (e.g., max and/or min I/O regulating policies), and (5) analytic operations, such as collecting performance metrics and usage data for virtual disk (IO, latency, etc.). Such hyperconverged infrastructure storage is described in detail in U.S. Pat. No. 9,666,523, while logical storage volumes are described in U.S. Pat. No. 8,775,773. Both of these U.S. Patents are incorporated herein by reference.

Figure 2:
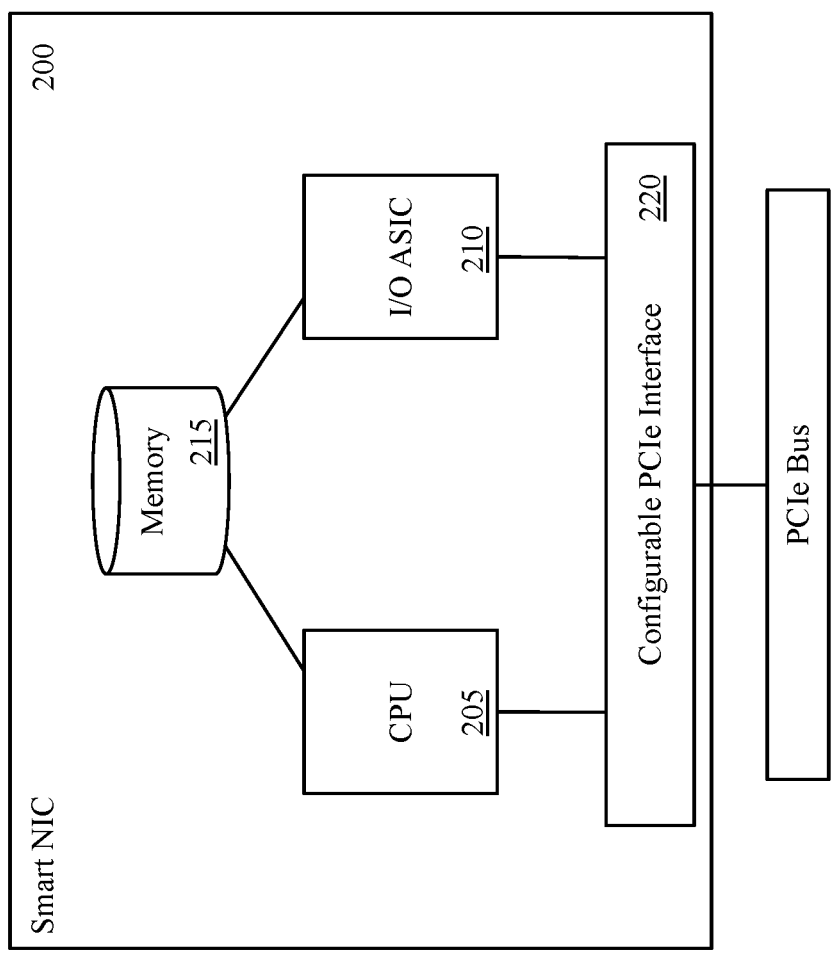
FIG. 2 conceptually illustrates the hardware of a smart NIC of some embodiments.

FIG. 2 conceptually illustrates the hardware of a smart NIC 200 of some embodiments. As shown, the smart NIC 200 includes its own general-purpose (x86) CPU 205, an application-specific integrated circuit (ASIC) 210, memory 215, and a configurable PCIe interface 220. The ASIC 210, in some embodiments, is an I/O ASIC that handles the processing of packets forwarded to and from the computer, and is at least partly controlled by the CPU 205. The configurable PCIe interface 220 enables connection of the smart NIC 200 to the other physical components of the bare metal computer system (e.g., the x86 CPU, memory, etc.) via the PCIe bus of the computer system. Via this configurable PCIe interface, the smart NIC 200 can present itself to the bare metal computer system as a multitude of devices, including a data message processing NIC, a hard disk (using non-volatile memory express (NVMe) over PCIe), or other types of devices.

Figure 3:
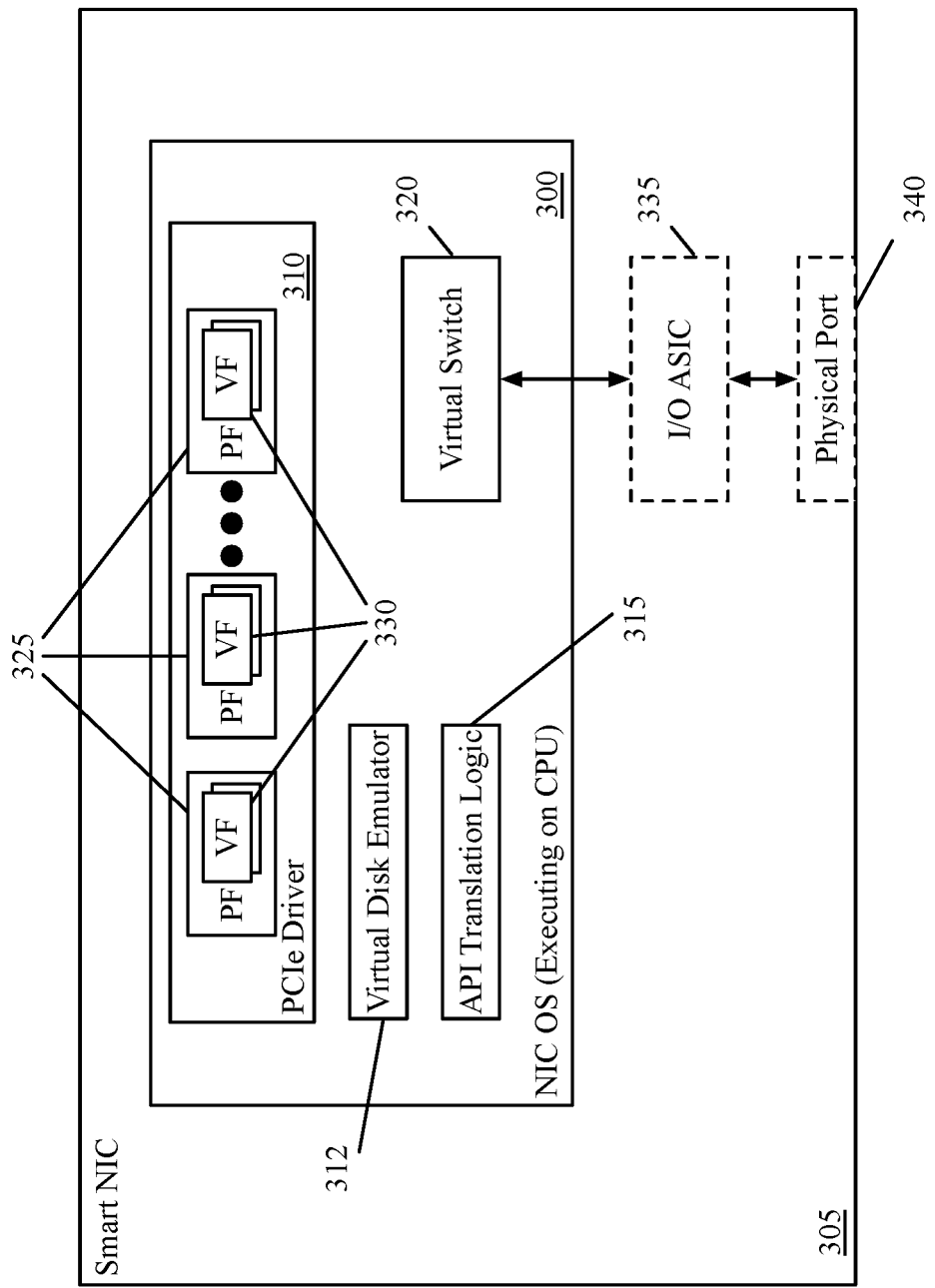
FIG. 3 conceptually illustrates the NIC OS of a smart NIC of some embodiments.

The CPU 205 executes a NIC operating system (OS) in some embodiments that controls the ASIC and can perform other operations, such as translation logic to enable the compute manager to communicate with the bare metal computer and to enable the bare metal computer to access a VM image (e.g., stored in external storage). FIG. 3 conceptually illustrates the NIC OS 300 of a smart NIC 305 of some embodiments. The NIC OS 300 is executed, in some embodiments, by the CPU of the smart NIC (e.g., CPU 205). This NIC OS 300 includes a PCIe driver 310, virtual disk emulator 312, API translation logic 315, and a virtual switch 320, among other components.

The PCIe driver 310 includes multiple physical functions 325, each of which is capable of instantiating multiple virtual functions 330. These different physical functions 325 enable the smart NIC to present as multiple different types of devices to the bare metal computer system via its PCIe bus. For instance, the smart NIC can present itself as a network adapter (for processing data messages to and from the computer system) as well as a non-volatile memory express (NVMe) disk. By presenting itself as an NVMe disk, the smart NIC 305 enables the bare metal computer system to use a VM image rather than an internal hard disk (or similar local non-volatile memory) to boot from and as its primary disk.

The NIC OS 300 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor, although the compute virtualization is not strictly necessary for a bare metal computer. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 300 of some embodiments executes the virtual switch 320. The virtual switch 320 enables the smart NIC to perform software-defined networking, and provide the I/O ASIC 335 of the smart NIC 305 with a set of flow entries so that the I/O ASIC 335 can perform flow processing offload (FPO) for the computer system. This FPO is described in more detail in U.S. provisional patent application 63/084,436, filed Sep. 28, 2020, which is incorporated herein by reference. The I/O ASIC 335, in some embodiments, receives data messages from the network and transmits data messages to the network via a physical network port 340.

In addition to acting as a NIC for processing data traffic, the smart NIC presents itself as an NVMe device to the bare metal computer system, as indicated. As such, the bare metal computer (e.g., the CPU of the bare metal computer) sends read/write instructions to the smart NIC (to boot the system, run applications, read and write files, etc.). The smart NIC OS 300 includes a virtual disk emulator 312 in some embodiments that handles these requests from the bare metal computer system and translates them for communication with the external storage. The virtual disk emulator 312 in some embodiments interprets NVMe requests received via the PCIe interface. In some embodiments, the NIC OS 300 includes additional layers depending on the type of storage used for the virtual disk (e.g., whether the storage is a distributed storage area network (DSAN) such as VSAN, a logical storage volume such as vVOL, the compute manager storage, etc.). In some embodiments, the NIC OS 300 streams the required data to and from the external storage (i.e., to and from a VM image at the external storage) using NVMe over Fabric (NVMeOF), so long as the external storage is NVMeOF-capable.

The smart NIC 305 also includes API translation logic 315 in some embodiments. In some embodiments, the smart NIC 305 enables a compute manager to use a uniform set of APIs to communicate with both VMs and the bare metal computer in the network. The compute manager, in some embodiments, is a system responsible for managing the DCNs (e.g., VMs, containers, bare metal servers, etc.) attached to the network. The compute manager manages the life cycle of these DCNs, enables users to control the DCNs, etc. The API translation logic 315 translates API requests in a first format from the compute manager into API requests in a second format native to the bare metal computer. For instance, physical computers typically use intelligent platform management interface (IPMI) or Redfish for remote configuration, retrieval of physical resource statistics, etc., whereas for VMs other protocols are used (e.g., platform-specific protocols). The translation logic 315 translates the API calls and responses between a unified format used by the compute manager and the native format of the bare metal computer system. In some embodiments, either hypervisors executing on host computers or smart NICs of those host computer also translates API calls and responses between the unified format used by the compute manager and the format used by the VMs.

By presenting itself as an attached non-volatile storage device (e.g., an NVMe device), the smart NIC of some embodiments enables the bare metal computer system to use a virtual machine disk image rather than an internal hard disk (or similar local non-volatile memory) as its primary disk (i.e., the disk from which the computer system boots its own OS, and which is the primary file storage for the computer system). As described, the smart NIC connects (via the PCIe bus) to the other components of the bare metal computer system (e.g., the x86 processor(s), the memory) and appears to these components as a local NVMe disk. As such, the bare metal computer sends read/write instructions to the smart NIC (to boot the system, run applications, read and write files, etc.), and the smart NIC of some embodiments streams the required data to and from the VM image at the external storage using NVMeOF. The read/write commands, in some embodiments, are disk read/write instructions from the CPU, which the smart NIC translates into file read/write commands and sends over NVMeOF. Specifically, in some embodiments, the smart NIC receives read/write instructions in the NVMe format, and translates these into NVMeOF using an NVMeOF driver or into a remote DSAN format using a remote DSAN driver.

Figure 4:
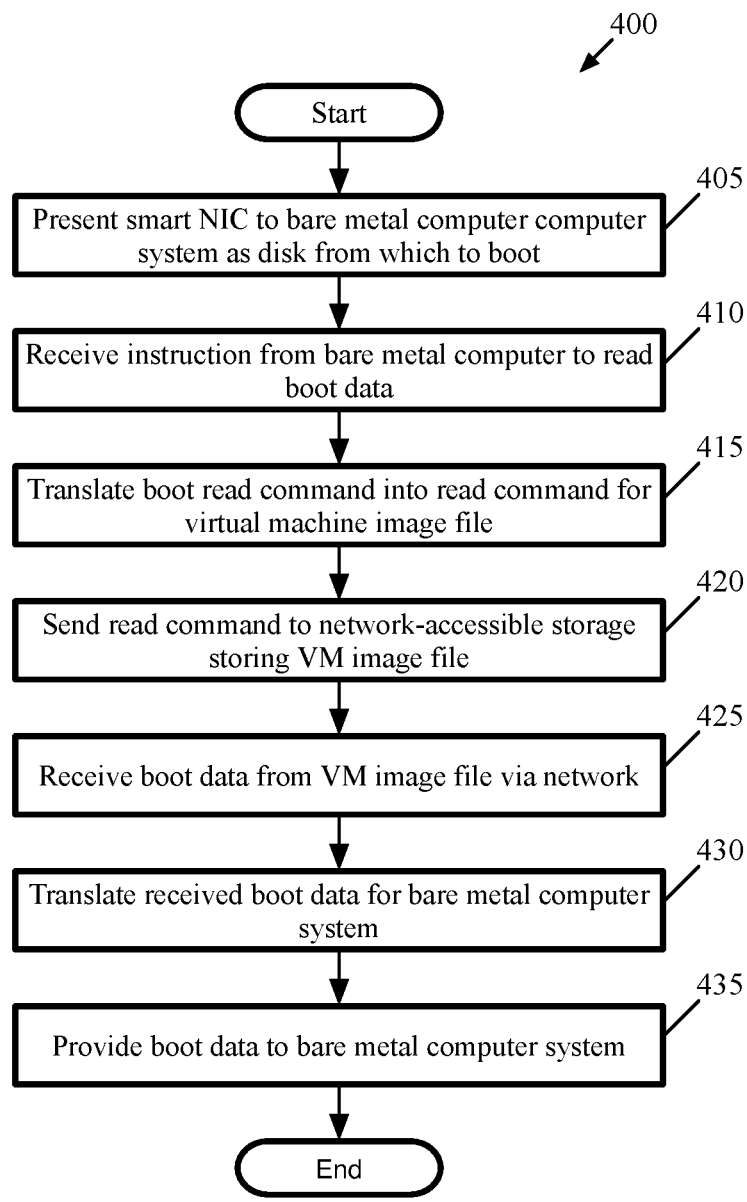
FIG. 4 conceptually illustrates a process of some embodiments for enabling a bare metal computer system to boot from a virtual machine image.

FIG. 4 conceptually illustrates a process 400 of some embodiments for enabling a bare metal computer system to boot from a virtual machine image. The process 400 is performed by a smart NIC of some embodiments (e.g., the virtual disk emulation layer or layers in the NIC OS executing on the smart NIC) that is part of the bare metal computer system, when the bare metal computer system boots up.

As shown, the process 400 begins by presenting (at 405) the smart NIC to the bare metal computer system as a disk from which to boot. In some embodiments, the smart NIC appears as a local NVMe disk when the computer system is powered on and the PCIe bus is initialized by the computer system firmware, and the firmware (e.g., BIOS) of the computer system is configured to use this (apparent) NVMe disk to boot from (i.e., rather than a local hard disk or other local non-volatile storage).

The process 400 then receives (at 410) instructions from the bare metal computer to read boot data. In some embodiments, this initial instruction comes from the BIOS and is for reading a boot loader into memory. In other embodiments, the boot loader is stored in non-volatile memory of the bare metal computer system, and the first instruction received by the smart NIC is from the boot loader, in order to start booting the operating system for the bare metal computer system.

The process 400 translates (at 415) the boot read command into a read command for a VM image file. In some embodiments, the VM image file is stored in a network-accessible storage (e.g., a distributed storage, a storage of the compute manager, etc.) in a proprietary VM-specific format, such as VM disk image (VMDK). The use of such a VM image enables a network administrator to save an image of a configured VM and then use that image to instantiate numerous VMs and/or physical servers. That is, the same VM image that is used to instantiate VMs in the network may also be used for the configuration (e.g., operating system, applications, etc.) of a bare metal physical computer. Thus, the same configuration can be applied by a user of the network to both types of machines (virtual and physical machines). The translation is performed by the virtual disk emulation layer of the smart NIC OS in some embodiments. In some embodiments, this VM image file is stored in a proprietary.

The process 400 then sends (at 420) the read command to the network-accessible storage that stores the VM image file. As described above, the network-accessible storage can be the compute manager storage (i.e., a set of files, including one or more VM images, stored by the compute manager), a distributed storage such as VSAN, etc. Some embodiments require that the network-accessible storage be NVMeOF compatible, so that the smart NIC can use the NVMeOF protocol to read data from and write data to the stored VM image. If VSAN or a similar distributed storage is used, in some embodiments a software layer for coordinating with such a distributed storage is part of the logic used by the smart NIC to translate the boot read commands. This software layer for connecting with a distributed storage such as VSAN may be part of the NIC OS kernel or a user space program, in different embodiments.

It should be noted that, in some embodiments, rather than the smart NIC translating the boot read command into a file read command for the VM image file, the network-accessible storage that stores the VM image file performs this translation. That is, in such embodiments, the smart NIC sends the boot read command to the network-accessible storage, which translates this into a file read command and sends the boot data to the smart NIC.

Next, the process receives (at 425) the boot data from the VM image file via the network. As indicated, this data is received via NVMeOF in some embodiments, and may be the boot loader (if the boot loader is not stored locally) or the initial OS boot data. In some embodiments, the operating system data is streamed from the network-accessible storage so that the data can be loaded into memory of the bare metal computer system.

The process translates (at 430) the received data for the bare metal computer system. This translation is performed by the same layer(s) as operation 415; if there are multiple software layers involved, then these layers perform their operations in the opposite order this time. The translation operations enable the data to appear as though it is being received by the computer system hardware from a local disk read operation.

Finally, the process 400 provides (at 435) the boot data to the bare metal computer system hardware. In some embodiments, the data is provided via the PCIe bus of the computer system, using NVMe over PCIe. The process 400 then ends. It should be understood, as mentioned, that this process may be ongoing as the operating system and any other required boot data is streamed from the externally-stored VM image to the computer system to be loaded into memory in some embodiments.

Figure 5:
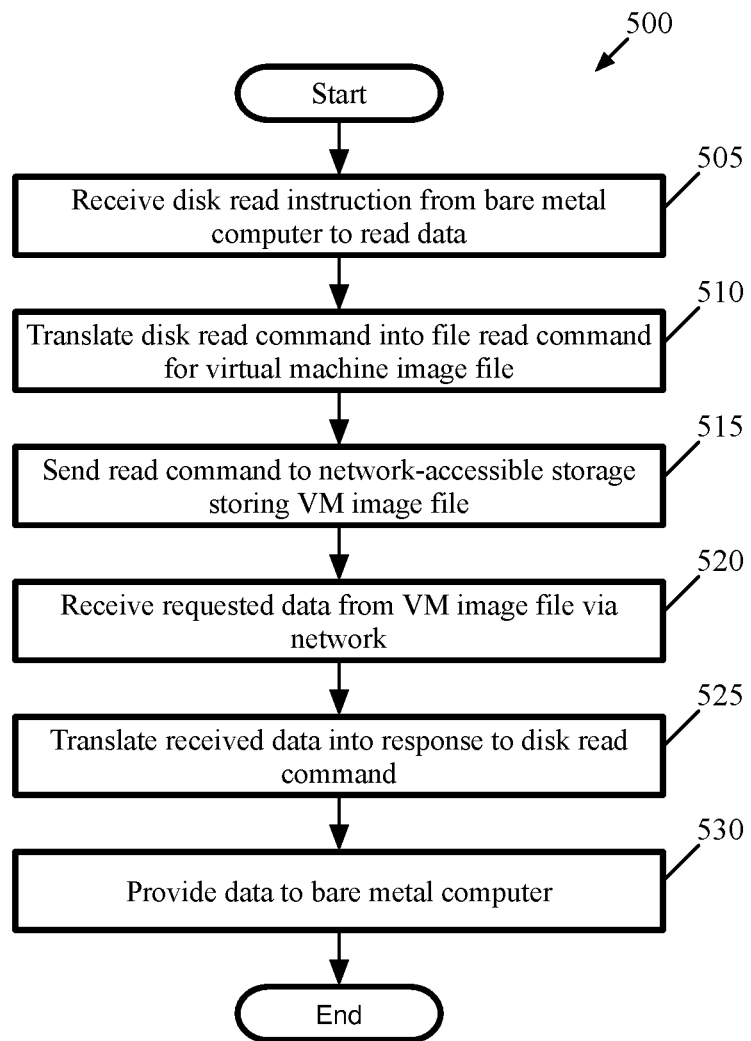
FIG. 5 conceptually illustrates a process of some embodiments for enabling a bare metal computer system to read data from a virtual machine image file.

FIG. 5 conceptually illustrates a process 500 of some embodiments for enabling a bare metal computer system to read data from a virtual machine image file. The process 500 is performed by a smart NIC of some embodiments (e.g., the virtual disk emulation layer or layers in the NIC OS executing on the smart NIC) that is part of the bare metal computer system. These operations are performed any time the computer system needs to read data that is part of the VM image (e.g., to run an application on top of the operating system, open a file, access a database that is part of the VM image, etc.).

As shown, the process 500 begins by receiving (at 505) instructions from the bare metal computer to read data. In some embodiments, this instruction comes from the CPU as a disk read instruction for a particular disk address. The disk read instruction is received via the PCIe bus as an NVMe over PCIe read instruction in some embodiments.

The process 500 translates (at 510) the disk read command into a file read command for the VM image file. As described, in some embodiments the VM image file is stored in a network-accessible storage (e.g., a distributed storage, a storage of the compute manager, etc.) in a proprietary VM-specific format, such as VMDK. Because the VM image file is a virtual disk rather than a physical disk, the translation operation translates the read location into specified data from the VM image file in some embodiments. The translation operation is performed by the virtual disk emulation layer of the smart NIC OS in some embodiments.

The process 500 then sends (at 515) the read command to the network-accessible storage that stores the VM image file. As described above, the network-accessible storage can be the compute manager storage (i.e., a set of files, including one or more VM images, stored by the compute manager), a distributed storage such as VSAN, etc. Some embodiments require that the network-accessible storage be NVMeOF compatible, so that the smart NIC can use the NVMeOF protocol to read data from the stored VM image. If VSAN or a similar distributed storage is used, in some embodiments a software layer for coordinating with such a distributed storage is part of the logic used by the smart NIC to translate the disk read commands.

It should be noted that, in some embodiments, rather than the smart NIC translating the disk read command into a file read command for the VM image file, the network-accessible storage that stores the VM image file performs this translation. That is, in such embodiments, the smart NIC sends the disk read command to the network-accessible storage, which translates this into a file read command and sends the requested data to the smart NIC.

Next, the process 500 receives (at 520) the requested data from the VM image file via the network. As indicated, this data is received via NVMeOF in some embodiments. In some embodiments, depending on the size of the requested data, the data is streamed from the network-accessible storage so that the data can be loaded into memory of the bare metal computer system.

The process 500 translates (at 525) the received data for the bare metal computer system. This translation is performed by the same layer(s) as operation 510 in some embodiments; if there are multiple software layers involved, then these layers perform their operations in the opposite order this time. The translation operations enable the data to appear as though it is being received by the computer system hardware from a local disk read operation. Finally, the process 500 provides (at 530) the requested data to the bare metal computer system hardware. In some embodiments, the data is provided via the PCIe bus of the computer system, using NVMe over PCIe. The process 500 then ends.

Figure 6:
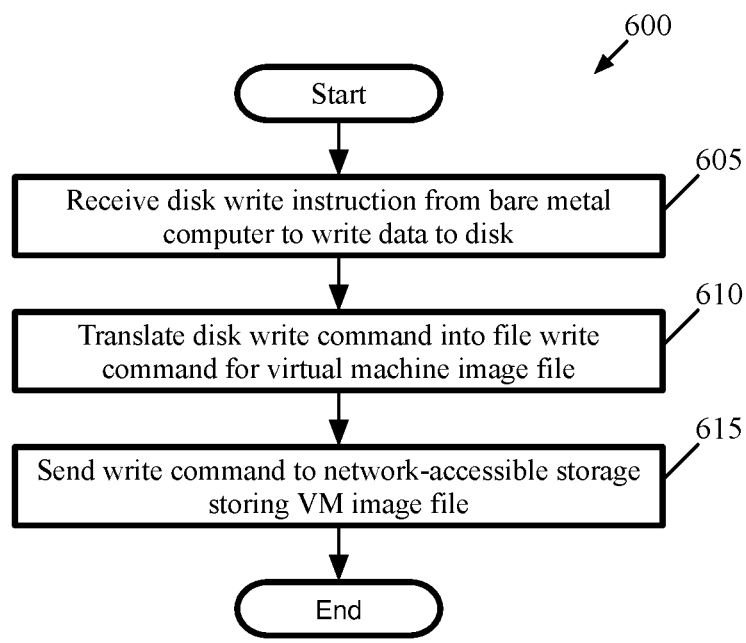
FIG. 6 conceptually illustrates a process of some embodiments for enabling a bare metal computer system to write data to a virtual machine image file.

FIG. 6 conceptually illustrates a process 600 of some embodiments for enabling a bare metal computer system to write data to a virtual machine image file. The process 600 is performed by a smart NIC of some embodiments (e.g., the virtual disk emulation layer or layers in the NIC OS executing on the smart NIC) that is part of the bare metal computer system. These operations are performed any time the computer system needs to write data to the VM image (e.g., to save data to a particular file, save a new file, etc.).

As shown, the process 600 begins by receiving (at 605) instructions from the bare metal computer to write data. In some embodiments, this instruction comes from the CPU as a disk write instruction for a particular disk address. The disk write instruction is received via the PCIe bus as an NVMe over PCIe write instruction in some embodiments.

The process 600 translates (at 610) the disk write command into a file write command for the VM image file. As described, in some embodiments the VM image file is stored in a network-accessible storage (e.g., a distributed storage, a storage of the compute manager, etc.) in a proprietary VM-specific format, such as VMDK. Because the VM image file is a virtual disk rather than a physical disk, the translation operation translates the write location into specified data for the VM image file in some embodiments. The translation operation is performed by the virtual disk emulation layer of the smart NIC OS in some embodiments.

The process 600 then sends (at 615) the write command to the network-accessible storage that stores the VM image file. As described above, the network-accessible storage can be the compute manager storage (i.e., a set of files, including one or more VM images, stored by the compute manager), a distributed storage such as VSAN, etc. Some embodiments require that the network-accessible storage be NVMeOF compatible, so that the smart NIC can use the NVMeOF protocol to write data to the stored VM image. If VSAN or a similar distributed storage is used, in some embodiments a software layer for coordinating with such a distributed storage is part of the logic used by the smart NIC to translate the disk write commands. The process 600 then ends, although in some embodiments an acknowledgment message is received from the external storage to indicate that the data has been written to the VM image file.

It should be noted that, in some embodiments, rather than the smart NIC translating the disk write command into a file write command for the VM image file, the network-accessible storage that stores the VM image file performs this translation. That is, in such embodiments, the smart NIC sends the disk write command to the network-accessible storage, which translates this into a file write command and writes the data to the VM image file.

Figure 7:
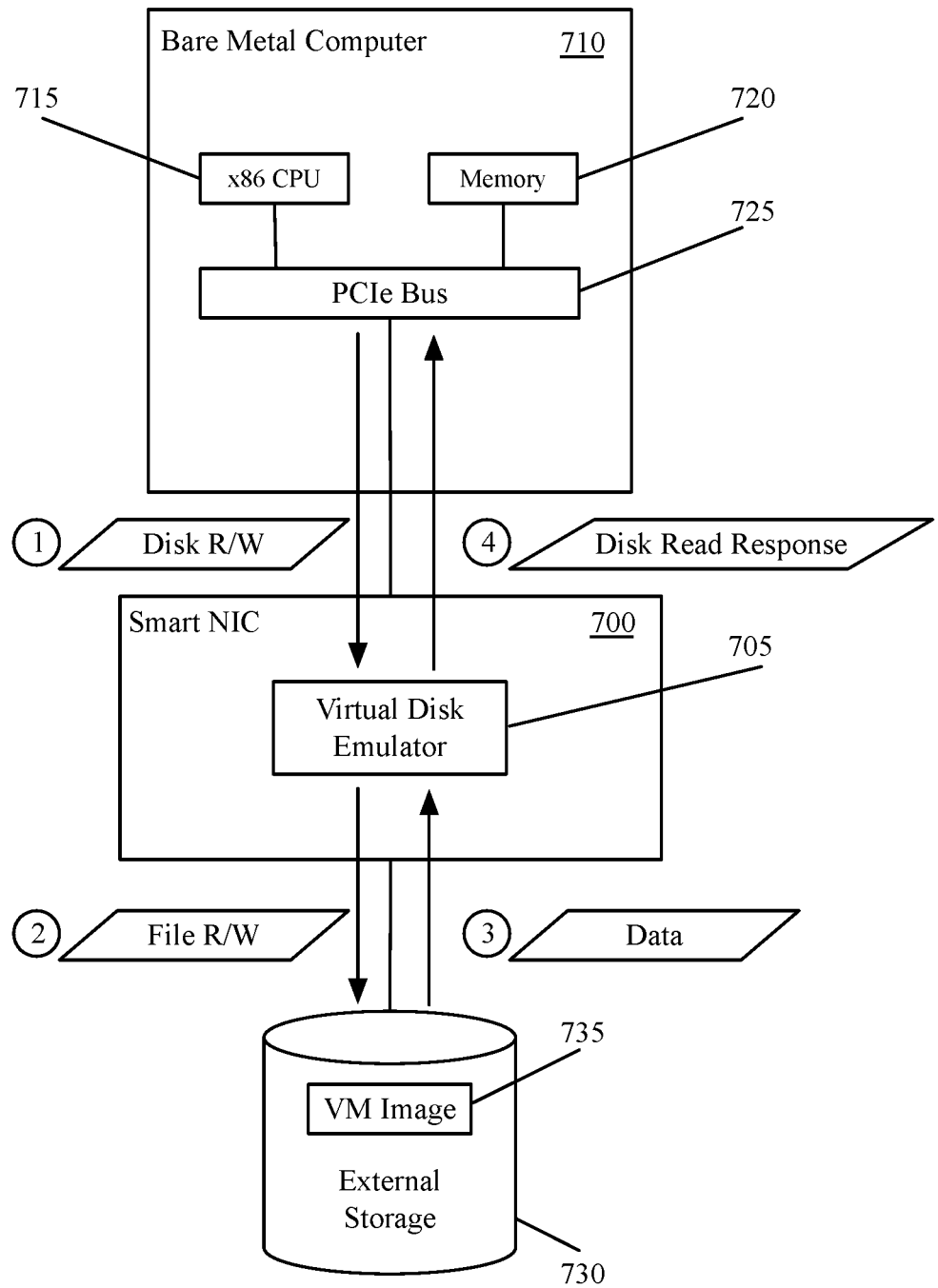
FIG. 7 conceptually illustrates the virtual disk emulator executing in a smart NIC performing translation for a disk read or write operation from a bare metal computer.

FIG. 7 conceptually illustrates the virtual disk emulator 705 executing in a smart NIC 700 performing such a translation for a disk read or write operation from a bare metal computer 710. As shown, the bare metal computer 710 includes an x86 CPU 715, memory 720, and a PCIe bus 725, which are described above by reference to FIG. 1. The smart NIC 700 includes a virtual disk emulator 705, which is described above by reference to FIG. 3.

As indicated by the encircled 1, the computer system 710 issues a disk read or write operation (e.g., an NVMe over PCIe operation) to a physical function of the smart NIC that connects to the PCIe bus to emulate an NVMe device. The virtual disk emulator 705 (possibly combined with other software layers executed by the NIC OS) translates this into a file read or write operation and sends this operation (e.g., via NVMeOF) to the external storage 730 that stores the VM image 735 used to boot the bare metal computer system 710 (i.e., that stores the operating system running on the bare metal computer system 710), as shown by the encircled 2.

This external storage 730, which may represent a distributed storage, a storage array, the storage associated with a compute manager, etc.) provides the requested data (for a read operation), as shown by the encircled 3, or stores the requested data (for a write operation), again via NVMeOF. For read operations, the virtual disk emulator 705 (and any other necessary software layers, depending on the nature of the external storage 730) translates the data into a response to the disk read operation. This response with the requested data is provided to the bare metal computer system 710 (e.g., to the CPU 715) via the PCIe bus 725.

Because the smart NIC enables a bare metal computer system to use an externally-stored virtual disk as though it is a locally-attached disk and to boot from this virtual disk, in some embodiments a datacenter user (e.g., a network admin, app developer, etc.) can configure a VM, save the VM configuration, and then deploy this configuration on a bare metal computer (or multiple bare metal computers) in addition to deploying the configuration on additional VMs.

Figure 8:
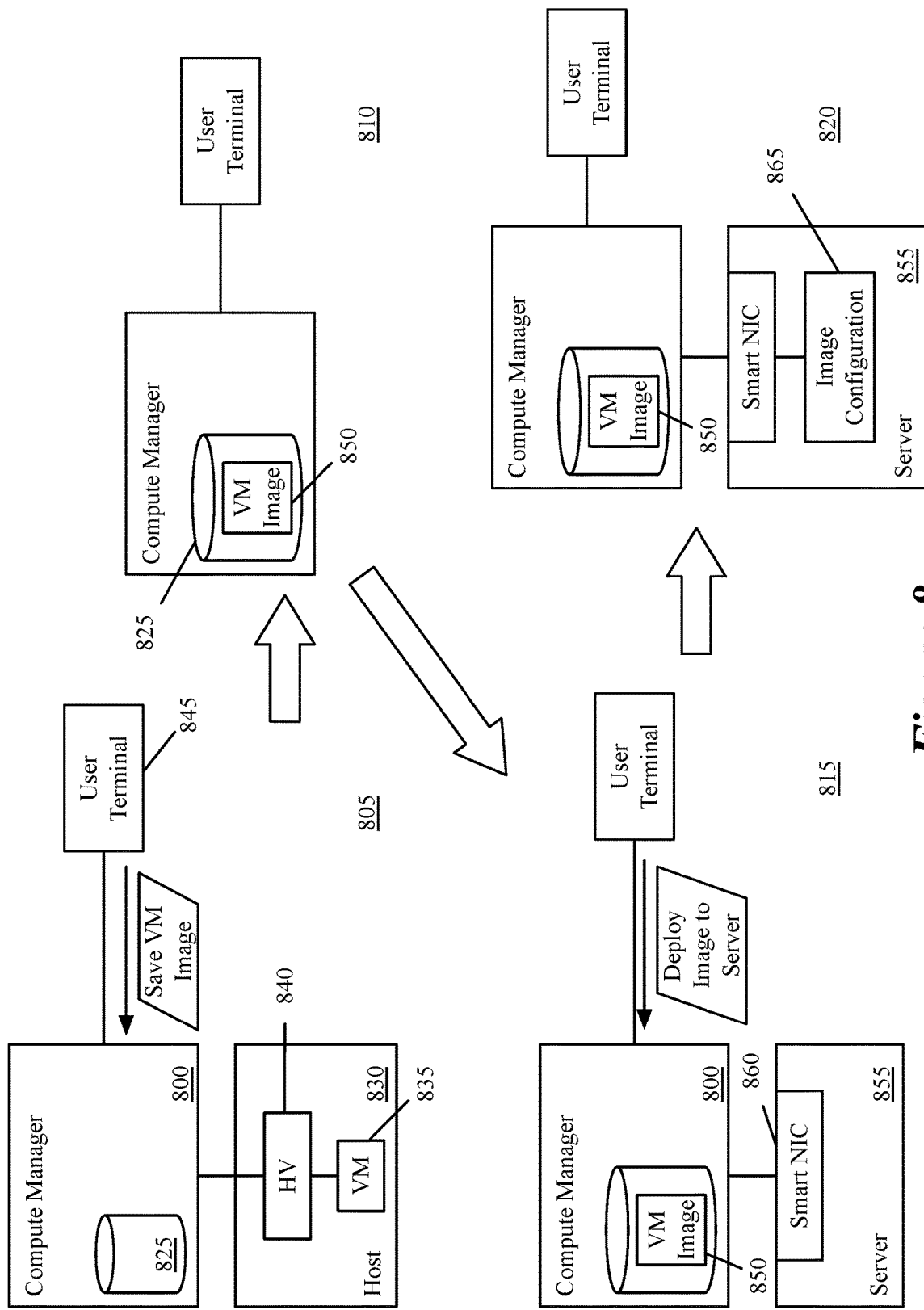
FIG. 8 conceptually illustrates the operations to deploy a VM image on a bare metal computer.

FIG. 8 conceptually illustrates the operations to deploy a VM image on a bare metal computer over four stages 805-820. As shown in the first stage 805, a compute manager 800 includes storage 825 (at this stage not shown to include any data). The compute manager 800 manages a host computer 830 on which a VM 835 executes on top of a hypervisor 840. This VM 835 has previously been configured by a user in some embodiments (e.g., through the compute manager 800, or by logging directly into the VM). The configuration includes loading a desired operating system on the VM, configuring the operating system, loading a desired set of applications, etc. With the VM 835 powered down, the user (via user terminal 845) commands the compute manager 800 to save an image of the VM.

The second stage 810 illustrates that a VM image 850 is stored in the compute manager storage 825, after the compute manager commands the host 830 (e.g., the hypervisor 840) to save an image of the VM 835. This VM image is a VMDK file in some embodiments, that stores the operating system, applications, and configuration for the VM 835, and which can be used to deploy additional VMs in the network. It should be noted that while this example shows the VM 835 as a VM in the network that is managed by the compute manager, and thus saved via the compute manager 800, in other embodiments the admin or other user could configure a VM and save a VM image offline or by directly logging into the VM 835 on the host 830.

The third stage 815 illustrates that the user (via the user terminal 845 commands the compute manager 800 to deploy the VM image to a physical server in the network. As shown at this stage, the compute manager 800 manages at least one physical (bare metal) server 855 with a smart NIC 860, in addition to the host computers in the network. Based on this command, the compute manager issues commands to the server 855 (via the smart NIC) to (i) use the stored VM image 850 as its boot disk (and primary disk for running applications, saving files, etc.). As described below, in some embodiments the compute manager uses a first set of APIs to communicate with the hardware of the server 855 (e.g., the same APIs used to communicate with VMs in the network), and the smart NIC translates these APIs into the native hardware APIs required by the physical server hardware. The fourth stage 820 illustrates that the server 855 is now up and running with the operating system and configuration 865 specified by the VM image 850, the VM configuration having been seamlessly deployed to a physical server.

As mentioned, the smart NIC also enables unified management of the VMs and bare metal computers in the network by enabling a compute manager that manages the machines in the network to use the same set of APIs for configuration and control of the VMs and bare metal computers. Typically, different APIs are used to communicate with VMs than are used to communicate with the bare metal hardware for operations such as powering on/off and configuring the machines and for providing remote console input (e.g., keyboard/mouse/touch input). The use of a smart NIC, at least at the bare metal computers, allows for the compute manager to use a uniform set of APIs, with the smart NIC translating API requests in a first format from the compute manager into API requests in a second format native to the bare metal computer.

Figure 9:
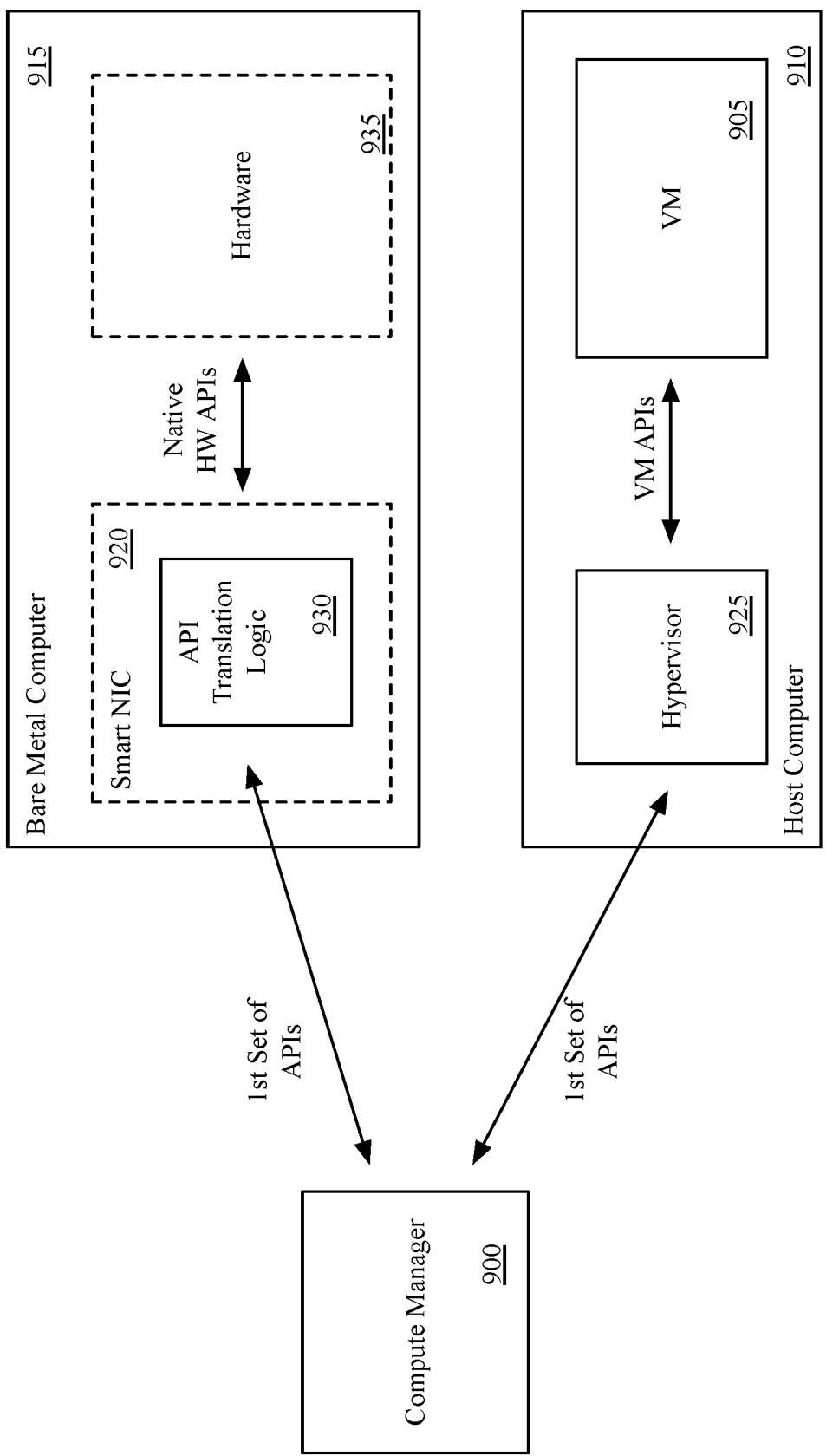
FIG. 9 conceptually illustrates a compute manager communicating with (i) a virtual machine on a host computer and (ii) the hardware of a bare metal computer using the same set of APIs.

FIG. 9 conceptually illustrates a compute manager 900 communicating with (i) a virtual machine 905 on a host computer 910 and (ii) the hardware of a bare metal computer 915 using the same set of APIs. As shown, the compute manager communicates with the smart NIC 920 of the bare metal computer 915 using a first set of APIs, which are also used to communicate with a hypervisor 925 of the host computer 910. The smart NIC 920 includes API translation logic 930 (i.e., as part of the smart NIC operating system) that translates these APIs into native hardware APIs in order to communicate with the hardware 935 of the bare metal computer 915. This hardware could be the x86 CPU, baseboard management controller, or other physical hardware of the computer. For instance, different types of APIs communicate with different hardware in some embodiments. Similarly, at the host computer 910, the hypervisor 925 translates between this first set of APIs and specific VM APIs in order for the compute manager 900 to communicate with and control the VM 905.

As an example, the compute manager 900 might use virtualized infrastructure manager (VIM) to communicate with hypervisors in a typical virtualized infrastructure. The translation logic 930 executing in the smart NIC 920 translates VIM API requests from the compute manager into the physical hardware APIs used by the bare metal computer. For instance, physical computers typically use intelligent platform management interface (IPMI) or Redfish for remote configuration, retrieval of physical resource statistics, etc., and the translation logical 930 of some embodiments translates VIM requests from VIM into IPMI or Redfish requests. Upon receiving a response, the translation logic 930 also translates the IPMI/Redfish responses into VIM responses. At the host computer 910, the hypervisor 925 also translates the VIM requests into a VM-specific API such as virtual machine communication interface (VMCI), enabling configuration, powering on and off of the VM, etc.

Similarly, the compute manager 900 might enable remote console sessions with the bare metal computer system, similar to a virtual machine. Here, an admin or other user can access and provide input to either the bare metal computer 915 or the VM 905 through the compute manager 900. The compute manager 900 uses the same set of remote console APIs, such as WebMKS, to communicate with the bare metal computer 915 and the VM 905. At the smart NIC 920, API translation logic 930 translates these uniform remote console APIs (e.g., WebMKS commands) into physical hardware APIs (e.g., virtual network computing (VNC)). This allows the remote user to provide input to the bare metal computer system 915 via the compute manager 900. Similarly, the hypervisor 925 at the host computer 910 translates commands in the uniform API into platform-specific commands for the VM, such as virtual KVM commands.

Through these techniques enabled by the smart NIC of some embodiments, the compute manager of some embodiments (e.g., VMware's vCenter) can manage a network with both hosted VMs and bare metal physical computers while treating each of these types of machines in the same manner. That is, the UI tools, management stacks, etc. for managing VMs can be applied equally to both VMs and bare metal physical computers. These tools include tools for managing and deploying VM images that can now be applied to deploying these images on bare metal physical computers, as well as tools for configuring, viewing, and accessing machines in the network.

Figure 10:
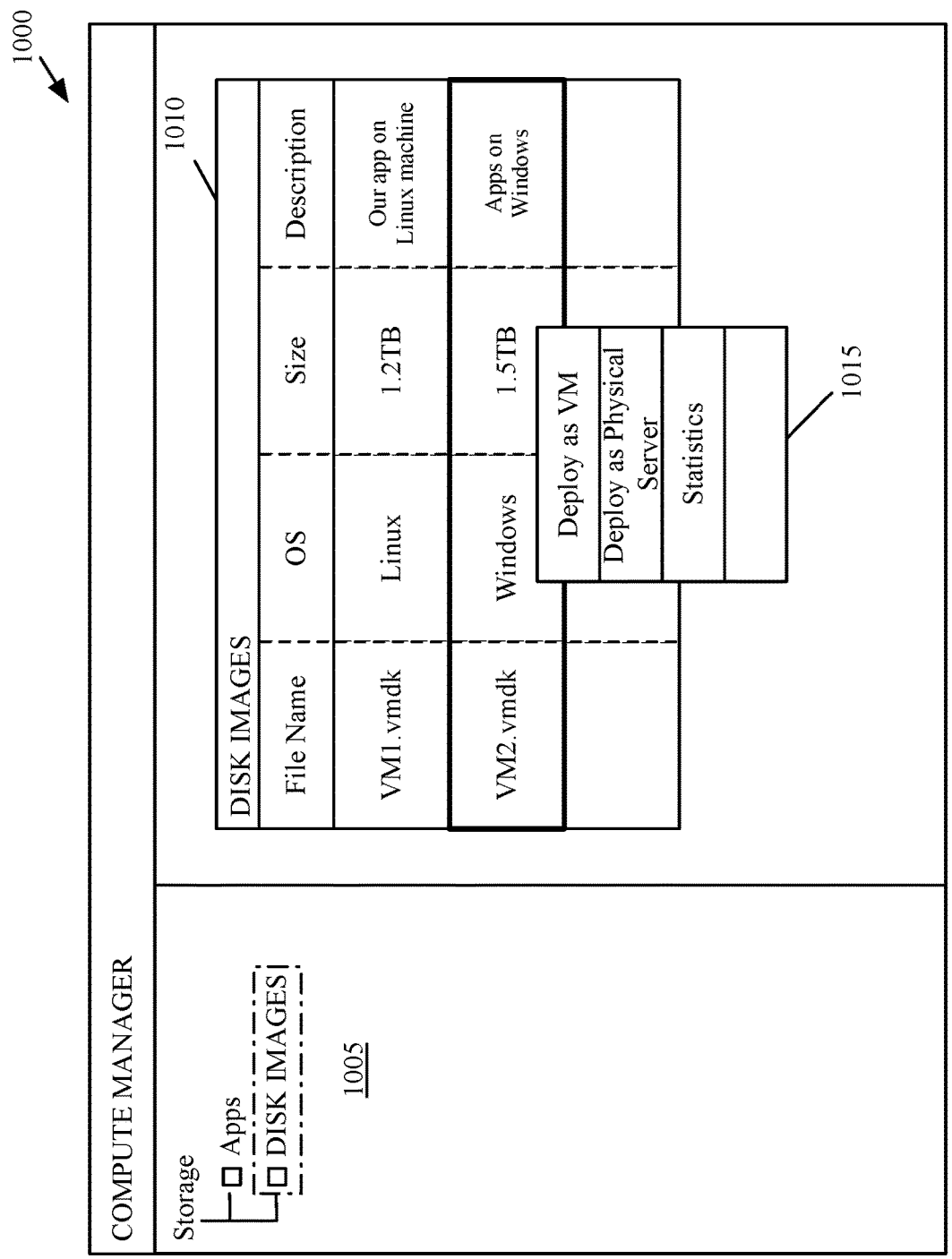
FIG. 10 illustrates a compute manager user interface of some embodiments that allows a user (e.g., a network administrator) to deploy a VM disk image as either a VM or a physical server.

FIG. 10 illustrates a compute manager user interface 1000 of some embodiments that allows a user (e.g., a network administrator) to deploy a VM disk image as either a VM or a physical server. As shown, the compute manager UI 1000 displays a storage display area 1005 showing various stored files associated with the compute manager, including a folder for applications and a folder for disk images, the latter of which is currently selected. In the main display area 1010, information about stored VM disk images is displayed by the compute manager. In this example, this information includes the file name of the VM image, the operating system of the VM image (i.e., the operating system that will be run by a VM or bare metal computer system deployed based on the VM image), the size of the VM image file, and a description.

The first VM disk image listed (VM1.vmdk) is an image of a Linux VM with a size of 1.2 TB, while the second VM disk image listed (VM2.vmdk) is an image of a Windows VM with a size of 1.5 TB. In this figure, the compute manager user has selected the second VM disk image in order to bring up a list of selectable options 1015 relating to the selected VM disk image. Specifically, in addition to the option to view statistics about the selected VM disk image, the user can opt to deploy the VM disk image either as a VM (as is common) or as a physical (bare metal) server, enabled by the smart NICs in the physical servers managed by the compute manager. In addition, some embodiments allow the user to select a VM disk image and deploy the image as numerous physical servers and/or numerous VMs at once (e.g., with each deployed VM or server using a different copy of the VM disk image).

Figure 11:
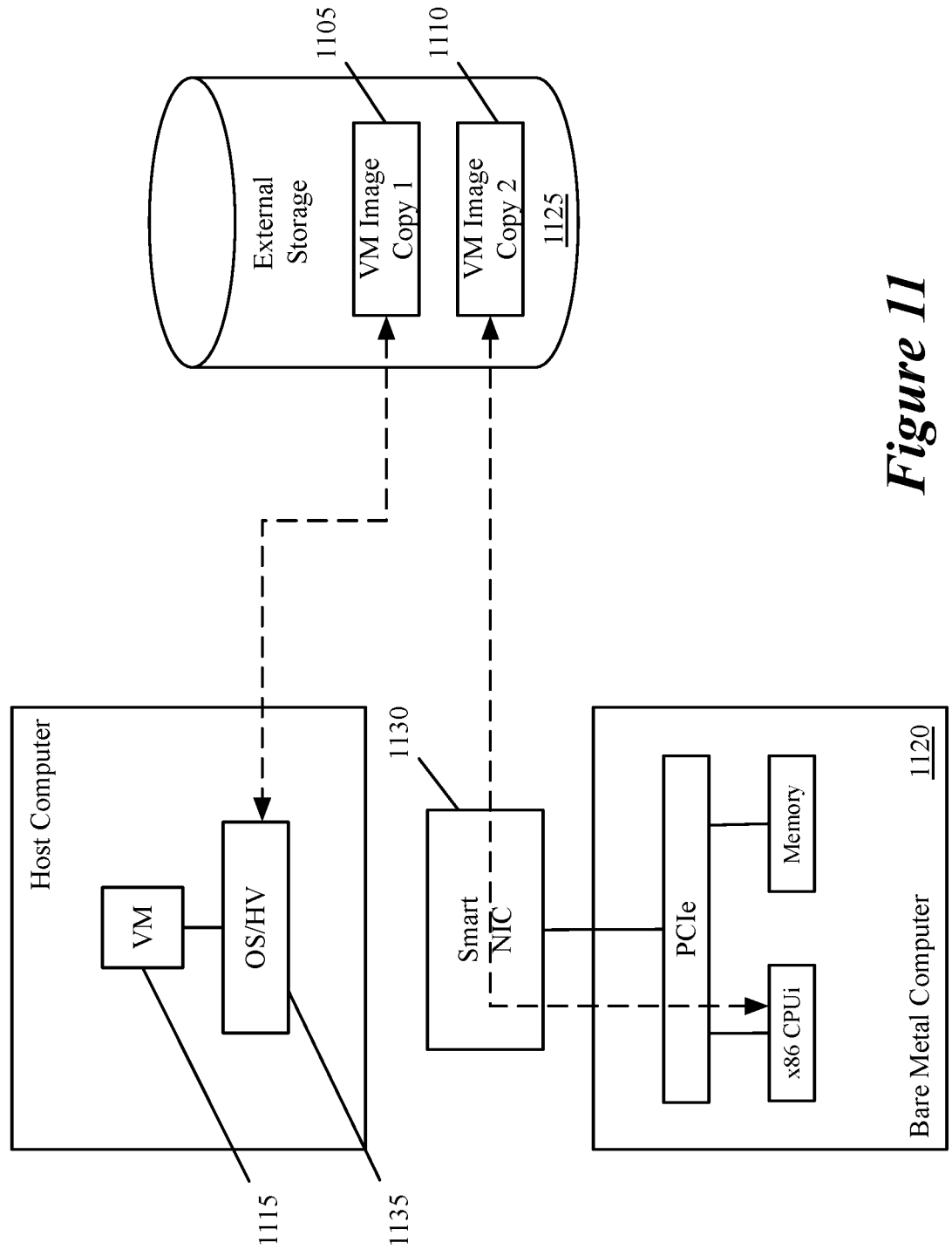
FIG. 11 conceptually illustrates two copies of the same VM image being used to deploy both a VM and a bare metal computer according to some embodiments.

FIG. 11 conceptually illustrates two copies 1105 and 1110 of the same VM image being used to deploy both a VM 1115 and a bare metal computer 1120 according to some embodiments. As shown, an external storage 1125 stores two copies 1105 and 1110 of the same VM image. These VM images are initially exact copies, though as the two machines 1115 and 1120 operate, the images might diverge as different files are saved, applications executed, etc. on the two different machines.

In the manner described above, the bare metal computer system 1120 accesses the second copy of the VM image 1110 in external storage, via the smart NIC 1130. The bare metal computer 1120 boots from this VM image file 1110 in addition to using the image file as its primary disk, with the smart NIC 1130 emulating a locally-attached disk and streaming data to and from the VM image file 1110. Similarly, the VM 1115 also boots from the VM image file 1105 in addition to using the image file as its primary disk, with the hypervisor 1135 emulating a locally-attached disk and streaming data to and from the VM image file 1105.

It should be noted that the above discussion relates to the case in which the physical infrastructure (i.e., the hardware) and the operating systems of the bare metal computers are managed by the same entity. In some embodiments, different entities manage the smart NIC and the operating system (e.g., a cloud provider manages the smart NIC hardware while a cloud customer is granted access over the x86 operating system, or the enterprise IT team manages the hardware while a particular application group or business line within the enterprise manages the x86 operating system). In these cases (or, for that matter, when the hardware and operating system are both managed by the same entity), the smart NIC can make a virtual disk (not necessarily a VM image file, but any virtual disk for storage) available as an NVMe device over the PCIe bus of the bare metal computer, while also acting as a network gatekeeper.

To enable this, in some embodiments, the smart NIC OS is instructed via an API call to make a particular (e.g., already existing) virtual disk visible to the x86 operating system (which boots from the local non-volatile storage, rather than a remote virtual machine image in this case). The smart NIC OS then mounts the virtual disk (e.g., using a remote VSAN client, network file system (NFS), or another protocol), and exposes this mounted virtual disk as an NVMe disk on the PCIe bus, thereby allowing the operating system operating on the x86 host to use the virtual disk as though it was a local non-volatile storage.

Figure 12:
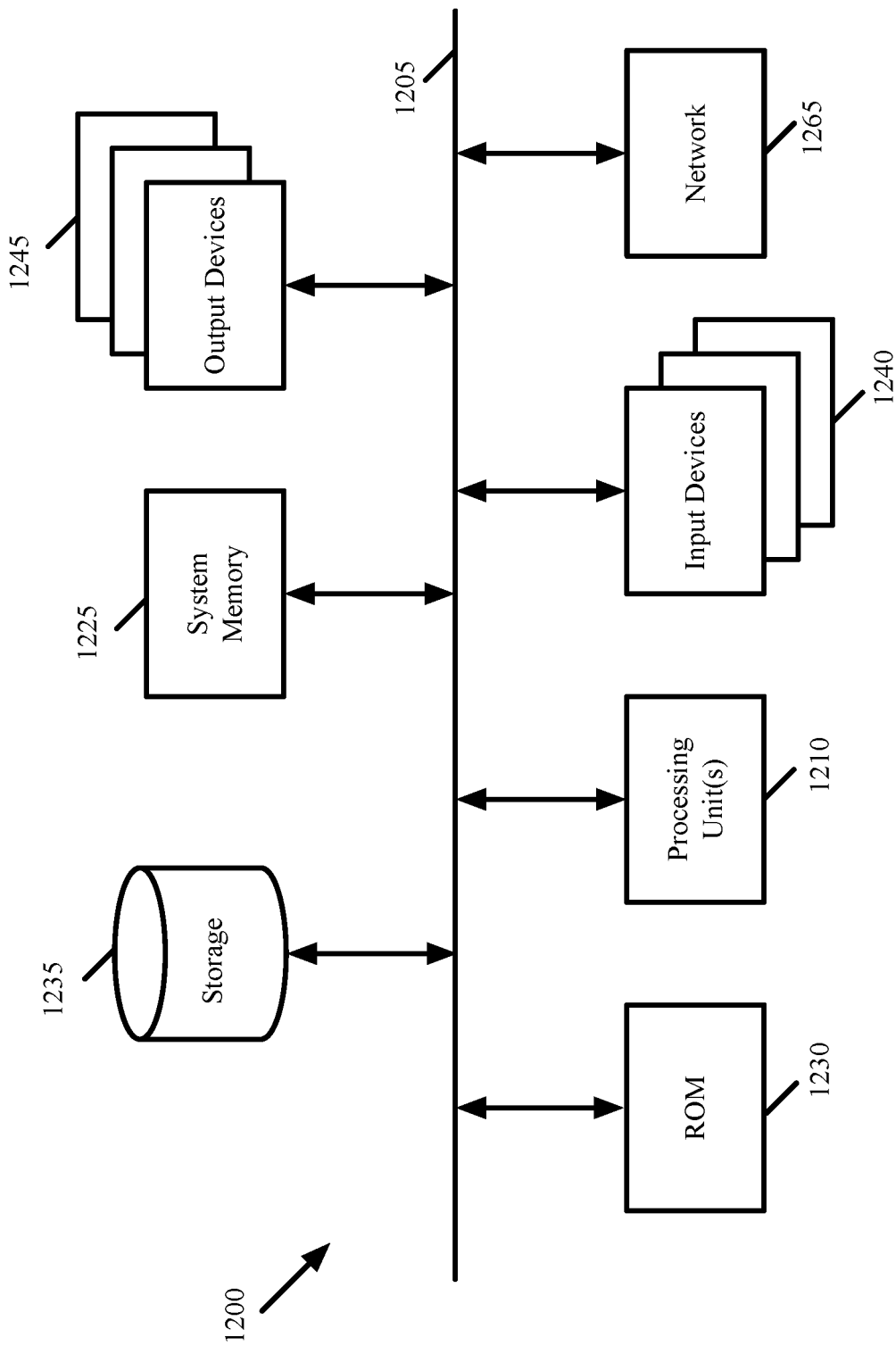
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4-6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for a compute manager that manages (i) virtual machines executing on host computers and (ii) physical computers, the method comprising:

using a first set of application programming interfaces (APIs) to communicate with a virtual machine (VM) executing on a host first computer via a hypervisor executing on the host first computer; and using the first set of APIs to communicate with a second computer via a smart network interface controller (NIC) of the second computer, wherein the smart NIC translates the first set of APIs into a different, second set of APIs for the second computer so that the compute manager manages the VM and the second computer with the same first set of APIs, wherein the smart NIC comprises an application specific integrated circuit (ASIC), a general purpose central processing unit (CPU), and a memory.

2. The method of claim 1, wherein the first set of APIs comprises APIs for managing a life cycle of a machine.

3. The method of claim 1, wherein the first set of APIs comprises APIs for handling input to a machine.

4. The method of claim 3, wherein the input comprises at least one of mouse input and keyboard input.

5. The method of claim 3, wherein the first set of APIs enable a remote console for the second computer via the compute manager.

6. The method of claim 1, wherein using the first set of APIs comprises:
sending a first API request to the second computer according to the first set of APIs, wherein the smart NIC receives the first API request and translates the first API request to a second API request according to the second set of APIs; and
receiving a first API response from the second computer according to the first set of APIs, wherein the smart NIC receives a second API response from the second computer according to the second set of APIs and translates the second API response to the first API responses.

7. The method of claim 1, wherein the CPU executes a peripheral control interface express (PCIe) interface that presents the smart NIC as a plurality of separate devices, the plurality of separate devices comprising at least one NIC and at least one non-volatile memory express (NVMe) storage device.

8. The method of claim 1, wherein the ASIC is for processing data messages forwarded to and from the second computing device.

9. The method of claim 1, wherein the CPU executes a NIC operating system program comprising translation logic for translating the first set of APIs to the second set of APIs.

10. A method for a compute manager that manages (i) virtual machines executing on host computers and (ii) physical computers, the method comprising:
using a first set of application programming interfaces (APIs) to communicate with a virtual machine (VM) executing on a host first computer via a hypervisor executing on the host first computer; and
using the first set of APIs to communicate with a second computer via a smart network interface controller (NIC) of the second computer, wherein the smart NIC translates the first set of APIs into a different, second set of APIs for the second computer so that the compute manager manages the VM and the second computer with the same first set of APIs,
wherein the first set of APIs are virtualized infrastructure manager (VIM) APIs that comprise APIs for managing a life cycle of a machine.

11. The method of claim 10, wherein the smart NIC comprises an application specific integrated circuit (ASIC), a general purpose central processing unit (CPU), and a memory.

12. A method for a compute manager that manages (i) virtual machines executing on host computers and (ii) physical computers, the method comprising:
using a first set of application programming interfaces (APIs) to communicate with a virtual machine (VM) executing on a host first computer via a hypervisor executing on the host first computer; and
using the first set of APIs to communicate with a second computer via a smart network interface controller (NIC) of the second computer, wherein the smart NIC translates the first set of APIs into a different, second set of APIs for the second computer so that the compute manager manages the VM and the second computer with the same first set of APIs,
wherein the smart NIC executes a network virtualization program for providing network virtualization services.

13. The method of claim 12, wherein the network virtualization services comprise segregating data messages into different private networks that are defined over a datacenter's shared network and forwarding the data messages for the private networks.

14. The method of claim 12, wherein the network virtualization services comprise at least one of network switching operations and network routing operations.

15. The method of claim 12, wherein the network virtualization services comprise middlebox services.

16. A non-transitory machine-readable medium storing a compute manager program which when executed by at least one processing unit manages (i) virtual machines executing on host computers and (ii) physical computers, the program comprising sets of instructions for:
using a first set of application programming interfaces (APIs) to communicate with a virtual machine (VM) executing on a host first computer via a hypervisor executing on the host first computer; and
using the first set of APIs to communicate with a second computer via a smart network interface controller (NIC) of the second computer, wherein the smart NIC translates the first set of APIs into a different, second set of APIs for the second computer so that the compute manager manages the VM and the second computer with the same first set of APIs,
wherein the smart NIC executes a network virtualization program for providing network virtualization services.

17. The non-transitory machine-readable medium of claim 16, wherein the first set of APIs comprises at least one of (i) APIs for managing a life cycle of a machine and (ii) APIs for handling input to a machine.

18. The non-transitory machine-readable medium of claim 16, wherein the set of instructions for using the first set of APIs comprises sets of instructions for:
sending a first API request to the second computer according to the first set of APIs, wherein the smart NIC receives the first API request and translates the first API request to a second API request according to the second set of APIs; and
receiving a first API response from the second computer according to the first set of APIs, wherein the smart NIC receives a second API response from the second computer according to the second set of APIs and translates the second API response to the first API responses.

19. The non-transitory machine-readable medium of claim 16, wherein the network virtualization services comprise segregating data messages into different private networks that are defined over a datacenter's shared network and forwarding the data messages for the private networks.

20. A non-transitory machine-readable medium storing a compute manager program which when executed by at least one processing unit manages (i) virtual machines executing on host computers and (ii) physical computers, the program comprising sets of instructions for:
using a first set of application programming interfaces (APIs) to communicate with a virtual machine (VM) executing on a host first computer via a hypervisor executing on the host first computer; and
using the first set of APIs to communicate with a second computer via a smart network interface controller (NIC) of the second computer, wherein the smart NIC translates the first set of APIs into a different, second set of APIs for the second computer so that the compute manager manages the VM and the second computer with the same first set of APIs,
wherein (i) the smart NIC comprises an application specific integrated circuit (ASIC), a general purpose central processing unit (CPU), and a memory, (ii) the CPU executes a peripheral control interface express (PCIe) interface that presents the smart NIC as a plurality of separate devices, the plurality of separate devices comprising at least one NIC and at least one non-volatile memory express (NVMe) storage device, (iii) the ASIC is for processing data messages forwarded to and from the second computing device, and (iv) the CPU executes a NIC operating system program comprising translation logic for translating the first set of APIs to the second set of APIs.

21. The non-transitory machine-readable medium of claim 20, wherein the smart NIC executes a network virtualization program for providing network virtualization services.

\* \* \* \* \*